United States Patent
Chang

(10) Patent No.: US 9,279,676 B2
(45) Date of Patent: Mar. 8, 2016

(54) PARALLAX BASED DISTANCE MEASURING DEVICE

(75) Inventor: Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 754 days.

(21) Appl. No.: 13/527,906

(22) Filed: Jun. 20, 2012

(65) Prior Publication Data

US 2013/0208108 A1 Aug. 15, 2013

(30) Foreign Application Priority Data

Feb. 10, 2012 (TW) .............................. 101104286 A

(51) Int. Cl.
*H04N 7/18* (2006.01)
*G01C 3/18* (2006.01)

(52) U.S. Cl.
CPC . *G01C 3/18* (2013.01); *H04N 7/181* (2013.01)

(58) Field of Classification Search
CPC .................................. G01C 3/18; H04N 7/181
USPC ........................................................ 348/135
See application file for complete search history.

(56) References Cited

U.S. PATENT DOCUMENTS

| 6,141,034 A * | 10/2000 | McCutchen | G02B 27/22 348/36 |
| 7,190,389 B1 * | 3/2007 | Abe | G03B 35/08 348/42 |
| 2009/0302219 A1 * | 12/2009 | Johnson | G01C 3/08 250/332 |

FOREIGN PATENT DOCUMENTS

| CN | 102132556 A | 7/2011 |
| TW | 201028647 A | 8/2010 |

* cited by examiner

*Primary Examiner* — Tat Chio
*Assistant Examiner* — Nguyen Truong
(74) *Attorney, Agent, or Firm* — Novak Druce Connolly Bove + Quigg LLP

(57) ABSTRACT

A distance measuring device includes a first camera and a second camera arranged side by side. The first camera includes a shell, a shaft, a camera module rotatably held in the shell via the shaft, a driver configured for driving the camera module to rotate, and a measuring device configured for measuring an angle that the camera module rotates. The camera module includes an optical axis substantially perpendicular to and intersecting with the shaft.

7 Claims, 4 Drawing Sheets

PARALLAX BASED DISTANCE MEASURING DEVICE

BACKGROUND

1. Technical Field

The present disclosure relates distance measuring devices and, particularly, to a parallax based distance measuring device.

2. Description of Related Art

Parallaxes can be used to determine distances. For example, two cameras can be employed to capture images of an object from different viewpoints. Then, the object is recognized and located in the images and thus the parallax and distance of the object can be calculated. The cameras are typically fixed relative to each other and have respective limited fields of view. However, the object must be present in both the fields of view of the cameras, otherwise, the object cannot be located in each of the images and thus the distance of the objected cannot be measured.

Therefore, it is desirable to provide a distance measuring device which can overcome the above-mentioned shortcomings.

DETAILED DESCRIPTION

Embodiments of the disclosure will be described in detail, with reference to the accompanying drawings.

Figure 1:
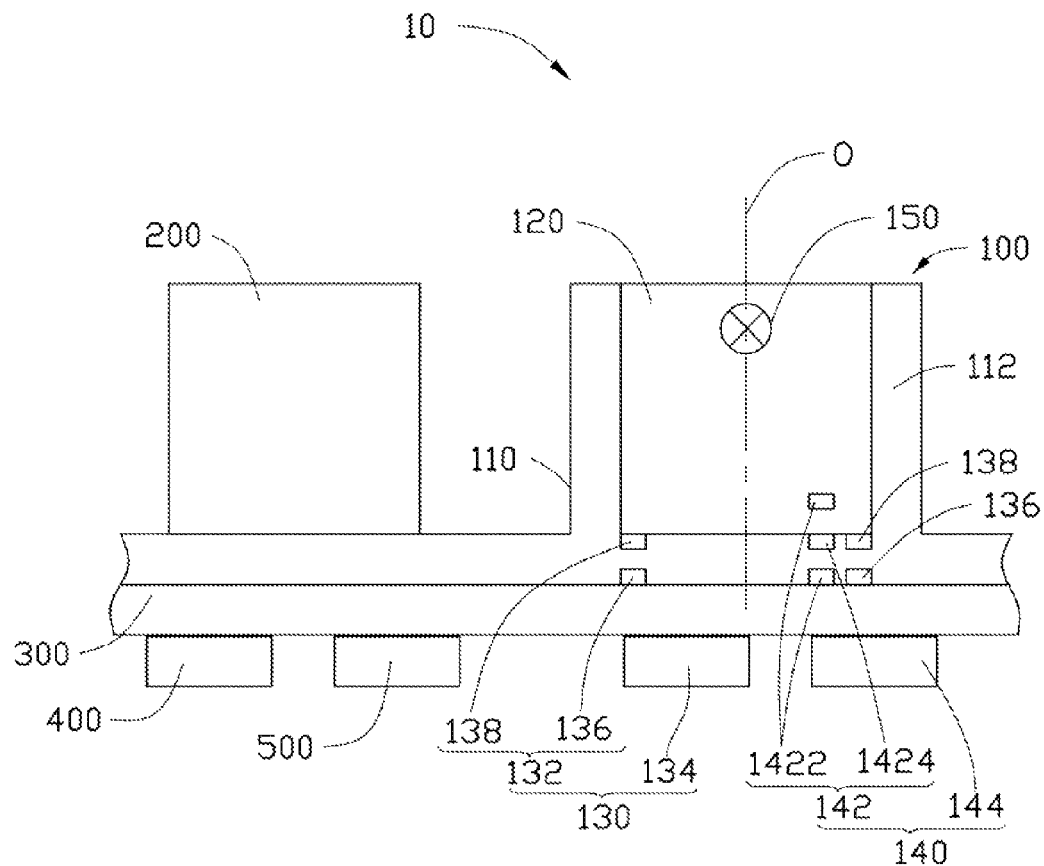
FIG. 1 is a schematic view of a distance measuring device, according to an embodiment.

Referring to FIG. 1, a distance measuring device 10, according to an embodiment, includes a first camera 100, a second camera 200, and a substrate 300.

The first camera 100 includes a shell 110, a camera module 120 rotatably held in the shell 120, a driver 130 to drive the camera module 120 to rotate, a measuring device 140 to measure an angle that the camera module 120 rotates, and a shaft 150.

The shell 110 is positioned on the substrate 300. The shell 110 and the substrate 300 cooperatively define a barrel-shaped receiving space 112 therebetween. The camera module 120 is received in the receiving space 112 and is rotatably connected to the shell 110 via the shaft 150. The shaft 150 is substantially perpendicular to and intersects with an optical axis O of the camera module 120. The camera module 120 is spaced away from the substrate 300 to allow the camera module 120 to rotate in the receiving space 112.

The driver 130 includes two pairs of magnetic elements 132 and a first driving circuit 134. Each pair of magnetic elements 132 includes an electromagnetic element 136 and a matching element 138. The matching element 138 can magnetically attract or repel the corresponding electromagnetic element 136 and can be a permanent magnet or an electromagnet. The matching elements 138 are fixed to an end of the camera module 120 facing the substrate 300 and diametrically arranged, symmetrical about the shaft 150. The electromagnetic elements 136 are positioned on the substrate 300, facing the respective matching elements 138. The first driving circuit 134 is configured for applying electric currents to the electromagnetic elements 136 and thus controlling torques on the matching elements 138 by the electromagnetic elements 136 such that the camera module 120 is driven to rotate or remain stationary.

In other embodiments, positions of the electromagnetic element 136 and the matching element 138 in each pair can be exchanged, that is, the electromagnetic element 136 is positioned on the camera module 120 and the matching element 138 is positioned on the substrate 300.

The measuring device 140 includes a Hall sensor 142 and a calculator 144. The Hall sensor 142 includes two magnets 1422 and a Hall element 1424. One of the two magnets 1422 is directly fixed to the substrate 300, and the other magnet 1422 is fixed to a first support 15 on the substrate 300 and spaced apart from the substrate 300. The Hall element 1424 is fixed to the camera module 120 and interposed between the two magnets 1422. In this embodiment, the Hall element 1424 is fixed to the end of the camera module 120 facing the substrate 300. As such, the Hall sensor 142 can measure a displacement of the Hall element 1424. The calculator 144 is configured for calculating the angle that the camera module 120 rotates, based upon the displacement of the Hall element 1424, coordinates of the Hall element 1424 and the shaft 150.

The second camera module 200 is positioned on the shell 110, aside the first camera 100.

Figure 2:
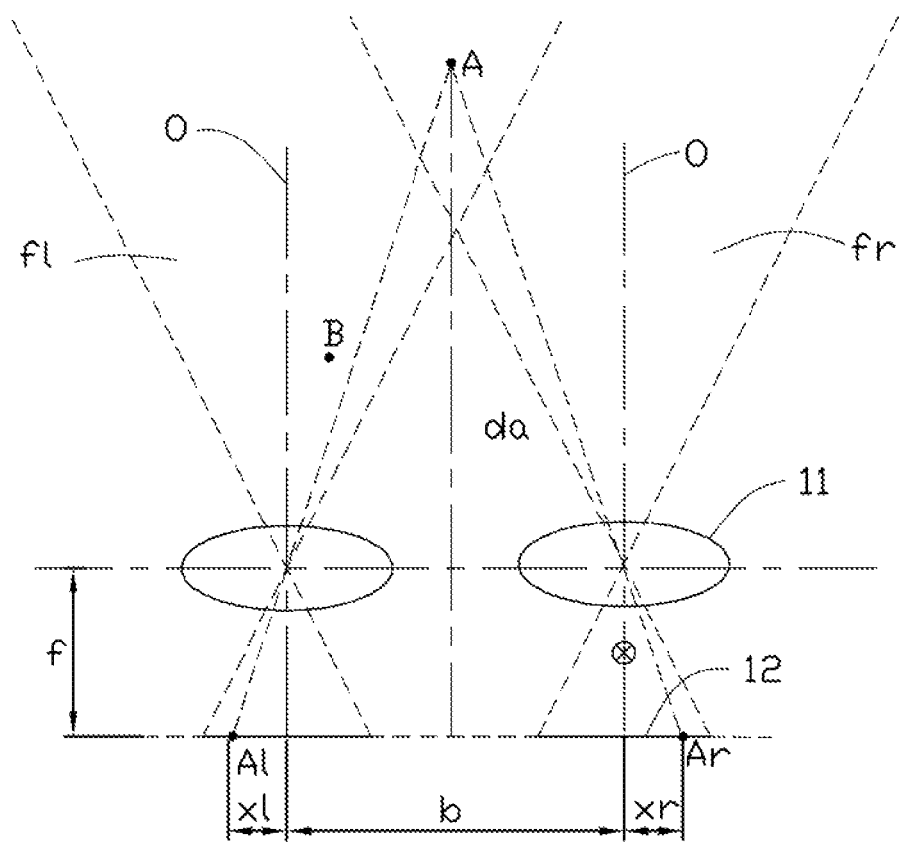
FIG. 2 is a schematic view showing operation principles of the distance measuring device of FIG. 1.

Referring to FIG. 2, each of the camera module 120 and the second camera 200 includes a lens 11 and an image sensor 12. Each lens 11 has an optical axis O (the optical axis O of the lens 11 of the cameral module 120 is the optical axis O of the camera module 120).

In operation, if a distance of a point A (the distance from the point A to a common line of the two image sensors 12, labeled as "da" in FIG. 2) is to be measured, the distance measuring device 10 can measure the distance da without rotating the camera module 120 as a point A is present in both a field of view fl of the camera module 120 and a field of view fr of the second camera 200. The point A forms an image Al in the second camera 200 and an image Ar in the camera module 120. The distance da can be measured and calculated by a formula: da=bf/(xl−xr), wherein xl is a distance between the image Al and the center of the corresponding image sensor 12, xr is a distance between the image Ar and the center of the corresponding image sensor, b is a distance between the centers of the image sensors 12, and f is a focal length of the camera module 120 and the second camera 200.

The distance measuring device 10 can further include a mode recognition device 400 and a calculation device 500. The mode recognition device 400 is connected to the camera module 120 and the second camera 200 and is configured for recognizing and locating the images Al, Ar. Thus the distances xl, xr can be obtained and sent to the calculation device 500. The distance and the focal length f can be input to the calculation device 500 in advance. The calculation device 500 is configured for calculating the distance da based upon the above-given formula.

Figure 3:
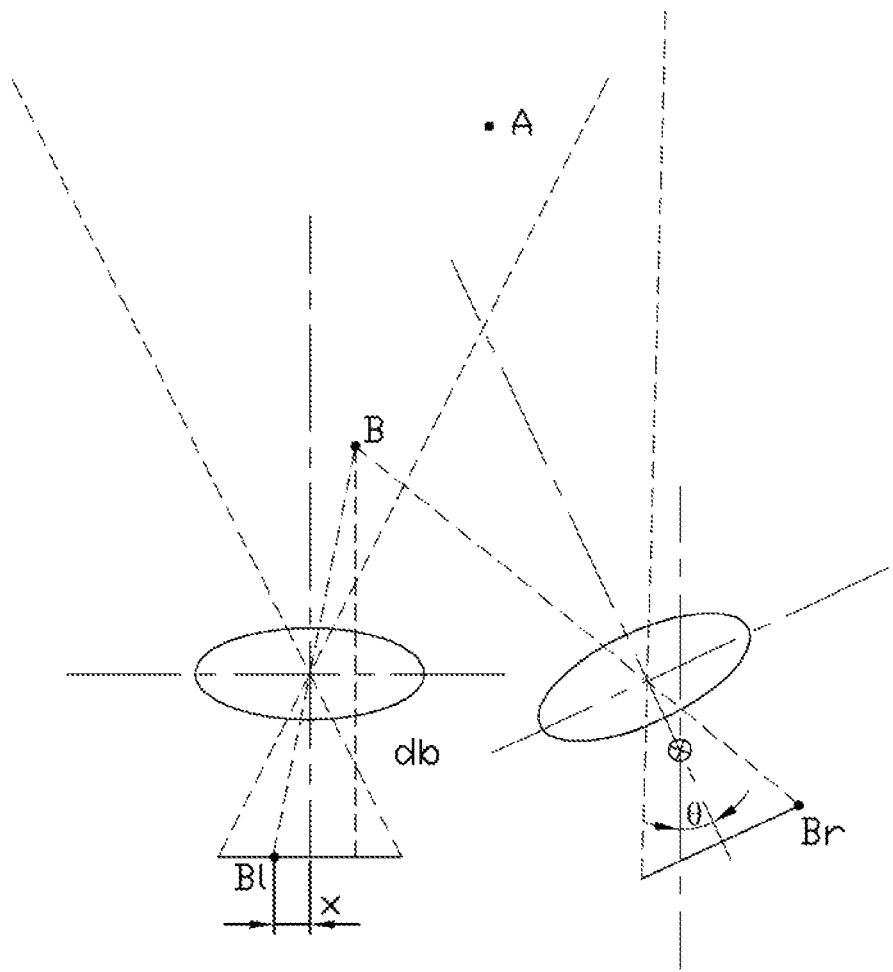
FIG. 3 is another schematic view showing operation principles of the distance measuring device of FIG. 1.

Referring to FIG. 3, if a distance db of a point B is to be measured. The camera module 120 needs to be rotated as the point B is not present in the field of view fr of the camera module 120 even that the point B presents in the field of view fl of the second camera 200 and form an image Bl. The camera module 120 is rotated until the point B just enters into the filed of view fl of the camera module 120 and forms an image Br at the edge of the corresponding image senor 12. The angle θ that the camera module 120 rotates can be measured by the measuring device 140 and can be sent to the calculation device 500. A distance x between the image Bl and the center of the corresponding image senor 12 is obtained by the mode recognition device 400 and sent to the calculation device 500. The calculation device 500 pre-stores an index table including a collection of index angles, a collection of index distances, and a collection of result distances. Each of the result distances is associated with an index angle and an index distance. For example, the index table can be:

| Entry 1-<br>Index Angle (θ) | Entry 2-<br>Index Distance (x) | Result-<br>Result Distance (db) |
|---|---|---|
| θ1 | x1 | db11 |
| θ1 | x2 | db12 |
| ... | ... | ... |
| θ1 | xn | db1n |
| θ2 | x1 | db21 |
| ... | ... | ... |
| θ2 | xn | db1n |
| ... | ... | ... |
| θm | xn | dbmn |

The calculation device 100 thus can calculate the distance da by indexing the index table and using interpolation, if needed.

The index table can be determined by experiments.

In other embodiments, the index table can be determined. However, the calculation device 500 is omitted and the distance da is indexed by users.

That is, distances of objects outside an overlap between the fields of view fl, fr of the second camera 200 and the camera module 120 can also be measured by rotating the camera module to include the objects in both the overlap.

Figure 4:
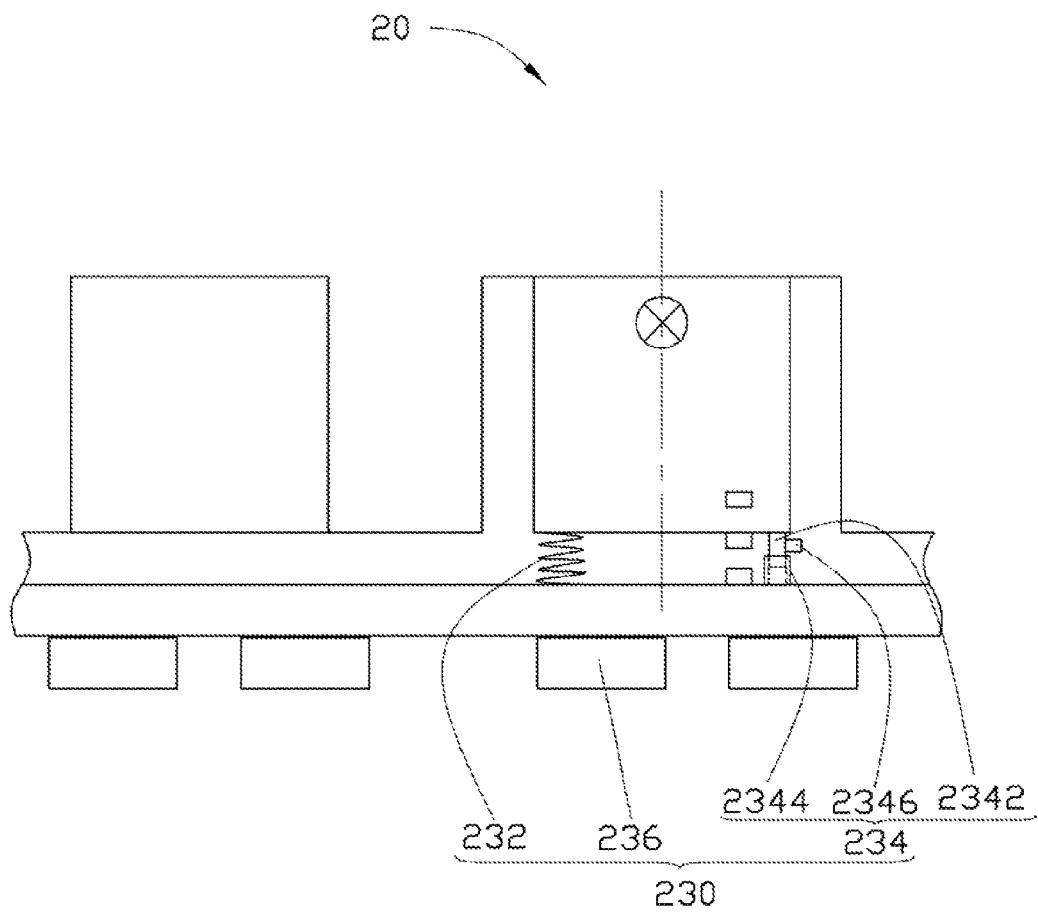
FIG. 4 is a schematic view of a distance measuring device, according to another embodiment.

Referring to FIG. 4, a distance measuring device 20, according to another embodiment, is substantially similar to the distance measuring device 10 but replacing the driver 130 with a driver 230.

The driver 230 includes a spring 232, a piezoelectric motor 234, and a second driving circuit 236. The spring 232 and the piezoelectric motor 234 are positioned between the camera module 120 and the substrate 300, and diametrically arranged at two opposite sides of the end of the camera module 120 facing the substrate 300 and symmetrically about the optical axis O.

The spring 232 is a coil spring and has two ends thereof connecting to the camera module 120 and the substrate 300, respectively. The spring 232 is in a natural state when the camera module 120 does not rotate.

The piezoelectric motor 234 includes a moving rod 2342, a guide 2344, and a piezoelectric vibrator 2346. The moving rod 2342 is fixed to the camera module 120. The guide 2344 is fixed to the substrate 300 and configured for guiding the moving rod 2342 to move along a direction substantially perpendicular to the substrate 300. The piezoelectric vibrator 2346 is fixed to a second support 25 on the substrate 300 and contacting with the moving rod 2342 to drive the moving rod 2342 to move by piezoelectric vibrations.

The second driving circuit 236 is configured for applying electric current to the piezoelectric vibrator 2346 to drive the camera module 120 to move along with the moving rod 2342 or remain stationary.

Particular embodiments are shown here and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A distance measuring device, comprising:
a first camera and a second camera arranged side by side, the first camera comprising:
a shell;
a shaft;
a camera module rotatably held in the shell via the shaft, the camera module comprising an optical axis substantially perpendicular to and intersecting with the shaft;
a driver connected to the camera module and configured for driving the camera module to rotate around the shaft;
a measuring device configured for measuring an angle that the camera module rotates around the shaft; and
a mode recognition device and a calculation device, the mode recognition device being configured for recognizing and locating a first image formed by the second camera and a second image formed by the camera module of an object present in both fields of view of the second camera and the camera module, the mode recognition device also being configured for measuring a first distance xl between the first image and a center of an image sensor of the second camera and a second distance xr between the second image and a center of an image sensor of the camera module, the calculation device being configured for calculating a distance da of the object by a formula: $da=bf/(xl-xr)$, wherein b is a distance between the centers of the image sensors of the second camera and the camera module, and f is a focal length of the camera module and the second camera.

2. The distance measuring device of claim 1, further comprising a substrate, wherein the shell is fixed on the substrate, the shell and the substrate cooperatively define a barrel-shaped receiving space, and the camera module is received in the receiving space and spaced away from the substrate to allow the camera to rotate.

3. The distance measuring device of claim 1, wherein the driver comprises two pairs of magnetic elements and a first driving circuit, each pair of magnetic elements comprises an electromagnetic element and a matching element that is capable of magnetically attracting or repelling with the corresponding electromagnetic element, the matching element is diametrically fixed to an end of the camera module facing the substrate and is symmetrical about the shaft, the electromagnetic element is positioned on the substrate, facing the respective matching element, and the first driving circuit is configured for applying electric currents to the electromagnetic element and controlling torques on the matching element by the electromagnetic element such that the camera module is driven to be rotate or remain stationary.

4. The distance measuring device of claim 1, wherein the driver comprises two pairs of magnetic elements and a first driving circuit, each pair of magnetic elements comprises an electromagnetic element and a matching element that is capable of magnetically attracting or repelling with the corresponding electromagnetic element, the electromagnetic element is diametrically fixed to an end of the camera module facing the substrate and is symmetrical about the shaft, the matching element is positioned on the substrate, facing the respective electromagnetic element, and the first driving circuit is configured for applying electric currents to the electromagnetic element and controlling torques on the matching element by the electromagnetic element such that the camera module is driven to be rotate or remain stationary.

5. The distance measuring device of claim 1, wherein the measuring device comprises a Hall sensor and a calculator, the Hall sensor comprises two magnets fixed to the substrate and a Hall element fixed to the camera module and interposed between the two magnets such that the Hall sensor is capable of measuring a displacement of the Hall element, and the calculator is configured for calculating the angle the camera module rotates, based upon the displacement of the Hall element, coordinates of the Hall element and the shaft.

6. The distance measuring device of claim 1, further comprising a mode recognition device and a calculation device, the mode recognition device being configured for recognizing and locating an image formed by the second camera of an object within a field of view of the second camera but outside a field of view of the camera module, the mode recognition device being configured for measuring a distance x between the image and a center of an image sensor of the second camera, the mode recognition device being configured for detecting whether the object present in a filed of view of the camera module when the camera module is driven to rotate and signals the measuring device to measure the angle that the camera module rotates around the shaft when the object just enters into the field of view of the camera module, the calculation device storing an index table comprising a collection of index angles, a collection of index distances, and a collection of result distances, each of the result distances is associated with an index angle and a index distance, the calculation device being configured for calculating the distance of the object by indexing the index table using the distance x and the angle the camera module rotates.

7. A distance measuring device, comprising:
a first camera and a second camera arranged side by side, the first camera comprising:
a shell;
a shaft;
a camera module rotatably held in the shell via the shaft, the camera module comprising an optical axis substantially perpendicular to and intersecting with the shaft;
a driver connected to the camera module and configured for driving the camera module to rotate around the shaft;
a measuring device configured for measuring an angle that the camera module rotates around the shaft; and
a mode recognition device and a calculation device, the mode recognition device being configured for recognizing and locating an image formed by the second camera of an object within a field of view of the second camera but outside a field of view of the camera module, the mode recognition device being configured for measuring a distance x between the image and a center of an image sensor of the second camera, the mode recognition device being configured for detecting whether the object present in a filed of view of the camera module when the camera module is driven to rotate and signals the measuring device to measure the angle that the camera module rotates around the shaft when the object just enters into the field of view of the camera module, the calculation device storing an index table comprising a collection of index angles, a collection of index distances, and a collection of result distances, each of the result distances is associated with an index angle and a index distance, the calculation device being configured for calculating the distance of the object by indexing the index table using the distance x and the angle the camera module rotates.

* * * * *